US012632917B2

(12) United States Patent
Phanishayee et al.

(10) Patent No.: US 12,632,917 B2
(45) Date of Patent: May 19, 2026

(54) INTEGRATED HARDWARE ARCHITECTURE AND DISTRIBUTION STRATEGY OPTIMIZATION FOR DEEP LEARNING MODELS

(71) Applicant: Microsoft Technology Licensing, LLC, Redmond, WA (US)

(72) Inventors: Amar Phanishayee, Seattle, WA (US); Divya Mahajan, Seattle, WA (US); Jakub Michal Tarnawski, Küsnacht (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 18/452,162

(22) Filed: Aug. 18, 2023

(65) Prior Publication Data

US 2025/0061533 A1     Feb. 20, 2025

(51) Int. Cl.
*G06T 1/20*          (2006.01)
*G06N 3/098*          (2023.01)

(52) U.S. Cl.
CPC ............... *G06T 1/20* (2013.01); *G06N 3/098* (2023.01)

(58) Field of Classification Search
CPC ........... G06T 1/20; G06N 3/098; G06N 3/063
USPC ......................................... 345/505
See application file for complete search history.

(56) References Cited

U.S. PATENT DOCUMENTS

2017/0103267 A1* 4/2017 Mishra .................... G06F 18/41
2020/0104687 A1* 4/2020 Gesmundo ............... G06N 3/08

2021/0027163 A1* 1/2021 Baker .................... G06N 3/045
2022/0035878 A1* 2/2022 Sarah ..................... G06N 3/082
2022/0129320 A1* 4/2022 Mohapatra ............. G06F 15/80
2022/0164666 A1* 5/2022 Liu ......................... G06N 3/082
2024/0086249 A1* 3/2024 Hu ......................... G06F 9/5027

(Continued)

FOREIGN PATENT DOCUMENTS

WO          2022235251 A1    11/2022

OTHER PUBLICATIONS

"Gurobi Optimizer Reference Manual", Retrieved from: https://www.gurobi.com/documentation/8.1/refman/index.html, 2019, 53 Pages.

(Continued)

*Primary Examiner* — Prabodh M Dharia
(74) *Attorney, Agent, or Firm* — NovoTechIP International PLLC

(57)          ABSTRACT

A training optimization system implements algorithmic solutions to solve the conjoined problem of accelerator architecture search and model partitioning for distributed training. The system makes the multi-dimensional optimization space of architecture search and device placement tractable by reducing the number of accelerator architectures explored through area-based heuristics and employing a novel integer linear program (ILP), the size of which is dependent only on the number of operators. The ILP scheduling optimization also explores the partitioning of operators across cores, known as intra-operator parallelism. Despite the vast space, the ILP described herein requires significantly less time to perform the optimizations across all explored accelerator configurations. Based on the optimal backward and forward pass latencies, the system leverages a novel dynamic programming (DP) approach to determine the device placement and model partitioning scheme.

20 Claims, 10 Drawing Sheets

(56) References Cited

U.S. PATENT DOCUMENTS

2024/0232594 A1*  7/2024  Yang ..................... G06N 20/00
2025/0162141 A1*  5/2025  Duburcq ............... B25J 9/0006

OTHER PUBLICATIONS

"NVIDIA Deep Learning NCCL Documentation", Retrieved from: https://docs.nvidia.com/deeplearning/nccl/index.html, Retrieved Date: Jul. 11, 2023, 1 Page.
"NVIDIA DGX Platform", Retrieved from: https://www.nvidia.com/en-in/data-center/dgx-platform/, Retrieved Date: Jul. 11, 2023, 17 Pages.
Angermueller, et al., "Model-based reinforcement learning for biological sequence design", In Proceedings of The International Conference on Learning Representations, Apr. 26, 2020, pp. 1-23.
Casper, et al., "NVIDIA / Megatron-LM", Retrieved from: https://github.com/NVIDIA/Megatron-LM, Jun. 15, 2023, 19 Pages.
Chen, et al., "Eyeriss v2: A Flexible Accelerator for Emerging Deep Neural Networks on Mobile Devices", In Journal on Emerging and Selected Topics in Circuits and Systems, vol. 9, Issue 2, Jun. 1, 2019, pp. 292-308.
Chen, et al., "Training deep nets with sublinear memory cost", In Repository of arXiv:1604.06174v1, Apr. 21, 2016, pp. 1-12.
Chen, et al., "TVM: An Automated End-to-End Optimizing Compiler for Deep Learning", In Proceedings of the 13th USENIX Symposium on Operating Systems Design and Implementation, Oct. 8, 2018, pp. 579-594.
Devlin, et al., "BERT: Pre-training of Deep Bidirectional Transformers for Language Understanding", In Repository of arXiv:1810.04805v2, May 24, 2019, 16 Pages.
Fowers, et al., "A configurable cloud-scale DNN processor for real-time AI", In Proceedings of ACM/IEEE 45th Annual International Symposium on Computer Architecture, Jun. 1, 2018, pp. 1-14.
Golovin, et al., "Google Vizier: A Service for Black-Box Optimization", In Proceedings of the ACM SIGKDD international conference on knowledge discovery and data mining, Aug. 13, 2017, pp. 1487-1496.
Huang, et al., "GPipe: Efficient Training of Giant Neural Networks using Pipeline Parallelism", In Journal of Advances in Neural Information Processing Systems, vol. 32, Dec. 8, 2019, pp. 1-10.
Jia, et al., "Beyond data and model parallelism for deep neural networks", In Repository of arXiv:1807.05358v1, Jul. 14, 2018, 15 Pages.
Jouppi, et al., "In-datacenter performance analysis of a tensor processing unit.", In Proceedings of the 44th annual international symposium on computer architecture, Jun. 24, 2017, pp. 1-12.
Jouppi, et al., "TPU v4: An Optically Reconfigurable Supercomputer for Machine Learning with Hardware Support for Embeddings", In Repository of arXiv:2304.01433, Apr. 4, 2023, 14 Pages.
Kao, et al., "ConfuciuX: Autonomous Hardware Resource Assignment for DNN Accelerators using Reinforcement Learning,", In Proceedings of 53rd Annual IEEE/ACM International Symposium on Microarchitecture (MICRO), Oct. 17, 2020, pp. 622-636.
Krizhevsky, et al., "Imagenet classification with deep convolutional neural networks", In journal of Communications of the ACM, vol. 60, Issue 6, Jun. 2017, pp. 84-90.
Kumar, et al., "Datadriven offline optimization for architecting hardware accelerators", In Repository of arXiv:2110.11346v1, Oct. 20, 2021, pp. 1-23.
Lu, et al., "Hardware Accelerator for Multi-Head Attention and Position-Wise Feed-Forward in the Transformer", In Proceedings of IEEE 33rd International System-on-Chip Conference, Sep. 8, 2020, pp. 84-89.
Mahajan, et al., "Tabla: A Unified Template-Based Framework for Accelerating Statistical Machine Learning", In Proceedings of IEEE International Symposium on High Performance Computer Architecture (HPCA), Mar. 12, 2016, pp. 14-26.

Narayanan, et al., "Memory-Efficient Pipeline-Parallel DNN Training", In Proceedings of the 38th International Conference on Machine Learning, Jul. 1, 2021, 11 Pages.
Narayanan, et al., "PipeDream: Generalized Pipeline Parallelism for DNN Training", In Proceedings of the 27th ACM Symposium on Operating Systems Principles, Oct. 27, 2019, 15 Pages.
Norrie, et al., "Google's training chips revealed: Tpuv2 and tpuv3", In Proceedings of IEEE Hot Chips 32 Symposium, Aug. 16, 2020, pp. 1-70.
Olyaiy, et al., "Sunstone: A Scalable and Versatile Scheduler for Mapping Tensor Algebra on Spatial Accelerators", In Proceedings of IEEE International Symposium on Performance Analysis of Systems and Software (ISPASS), Apr. 23, 2023, pp. 259-271.
Parashar, et al., "Timeloop: A Systematic Approach to DNN Accelerator Evaluation", In Proceedings of IEEE International Symposium on Performance Analysis of Systems and Software (ISPASS), Mar. 24, 2019, pp. 304-315.
Radford, et al., "Language Models are Unsupervised Multitask Learners", In Journal of OpenAI Blog, vol. 1, Issue 8, Feb. 24, 2019, 24 Pages.
Reed, et al., "torch.fx: Practical program capture and transformation for deep learning in python", In Repository of arXiv:2112.08429v1, Dec. 15, 2021, 14 Pages.
Sakhuja, et al., "Leveraging Domain Information for the Efficient Automated Design of Deep Learning Accelerators", In Proceedings of IEEE International Symposium on High-Performance Computer Architecture, Feb. 25, 2023, pp. 1-15.
Shao, et al., "Simba: Scaling Deep-Learning Inference with Multi-Chip-Module-Based Architecture", In Proceedings of the 52nd Annual IEEE/ACM International Symposium on Microarchitecture, Oct. 12, 2019, 14 Pages.
Shoeybi, et al., "Megatron-LM: Training Multi-Billion Parameter Language Models Using Model Parallelism", In Repository of arXiv:1909.08053v4, Mar. 13, 2020, 15 Pages.
Tarnawski, et al., "Efficient Algorithms for Device Placement of Dnn Graph Operators", In Advances Neural Information Processing Systems, 2020, 13 Pages.
Tarnawski, et al., "Piper: Multidimensional Planner for DNN Parallelization", In Proceedings of the 35th Conference on Neural Information Processing Systems, Dec. 6, 2021, 12 Pages.
Wang, et al., "Blink: Fast and generic collectives for distributed ml", In Proceedings of the 3rd ML System Conference, Mar. 2, 2020, 15 Pages.
Wilton, et al., "CACTI: an enhanced cache access and cycle time model", In IEEE Journal of Solid-State Circuits, vol. 31, Issue 5, May 1996, pp. 677-688.
Wolf, et al., "Huggingface's transformers: State-of-the-art natural language processing", In Repository of arXiv:1910.03771v1, Oct. 9, 2019, 11 Pages.
Wu, et al., "Accelergy: An Architecture-Level Energy Estimation Methodology for Accelerator Designs", In Proceeding's of IEEE/ACM International Conference on Computer-Aided Design (ICCAD), Nov. 4, 2019, 8 Pages.
Xiao, et al., "Hasco: Towards agile hardware and software co-design for tensor computation", In Proceedings of the 48th Annual International Symposium on Computer Architecture, Jun. 2021, pp. 1055-1068.
Yazdanbakhsh, et al., "Apollo: Transferable Architecture Exploration", In Repository of arXiv:2102.01723v1, Feb. 2, 2021, 10 Pages.
Zhang, et al., "A Full-Stack Search Technique for Domain Optimized Deep Learning Accelerators", In Proceedings of the 27th ACM International Conference on Architectural Support for Programming Languages and Operating Systems, Feb. 28, 2022, pp. 27-42.
Zhang, et al., "OPT: Open Pre-trained Transformer Language Models", In Repository of arXiv:2205.01068v1, May 2, 2022, 30 Pages.
Zhou, et al., "Research on NVIDIA Deep Learning Accelerator", In Proceedings of 12th IEEE International Conference on Anti-counterfeiting, Security, and Identification, Nov. 9, 2018, pp. 192-195.
Mirhoseini, et al., "Device Placement Optimization with Reinforcement Learning", In Repository of arXiv:1706.04972, Jun. 25, 2017, 11 Pages.

(56) References Cited

OTHER PUBLICATIONS

International Search Report and Written Opinion received for PCT Application No. PCT/US2024/038931, Nov. 12, 2024, 17 pages.
International Preliminary Report on Patentability (Chapter I) received for PCT Application No. PCT/US2024/038931, mailed on Mar. 5, 2026, 11 Pages.

* cited by examiner

| Parameter Description | Notation | Potential Values |
|---|---|---|
| Number of Tensor Cores | num_tc | 1 to 4096 powers of 2 |
| Number of Vector Cores | num_vc | 1 to 4096 powers of 2 |
| Number of PEs in x dimension | PE_x | 1 to 256 powers of 2 |
| Number of PEs in y dimension | PE_y | 1 to 256 powers of 2 |
| Vector Lane Width | PE_vc | 1 to 256 powers of 2 (= PE_x) |
| Number of Fused Cores | num_fc | min(num_tc, num_vc) |

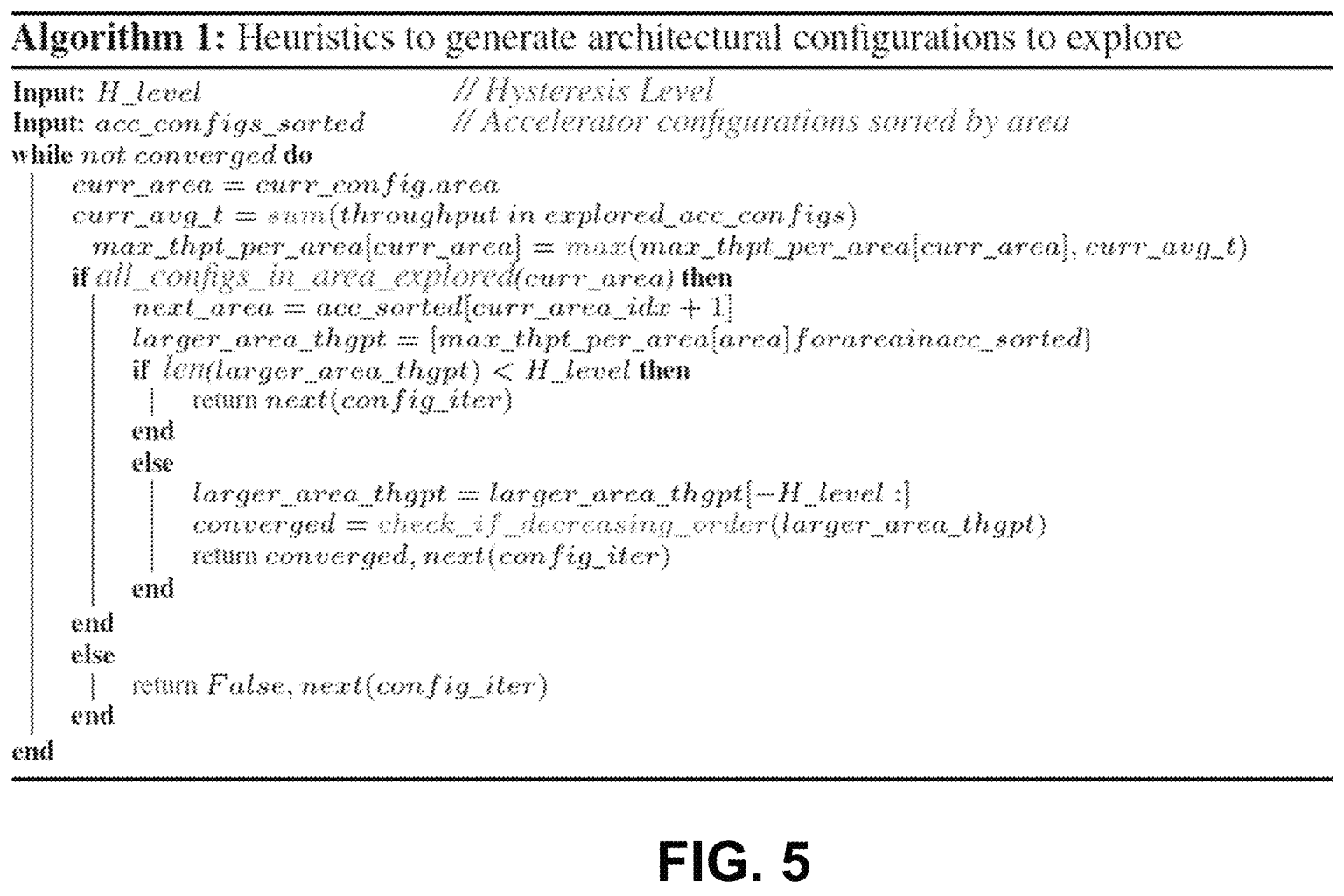

Algorithm 1: Heuristics to generate architectural configurations to explore

Input: $H\_level$                   // *Hysteresis Level*
Input: $acc\_configs\_sorted$        // *Acceleration configurations sorted by area*
while *not converged* do

$curr\_area = curr\_config.area$
    $curr\_avg\_t = sum(throughput\ in\ explored\_acc\_configs)$
    $max\_thpt\_per\_area[curr\_area] = max(max\_thpt\_per\_area[curr\_area], curr\_avg\_t)$
    if *all configs in area explored(curr\_area)* then

$next\_area = acc\_sorted[curr\_area\_idx + 1]$
        $larger\_area\_thgpt = [max\_thpt\_per\_area[area]\ for\ area\ in\ acc\_sorted]$
        if *len(larger\_area\_thgpt)* $< H\_level$ then

*return next(config\_iter)* end
        else

$larger\_area\_thgpt = larger\_area\_thgpt[-H\_level:]$
            $converged = check\_if\_decreasing\_order(larger\_area\_thgpt)$
            *return converged, next(config\_iter)* end end
    else

*return False, next(config\_iter)* end end

FIG. 5

| Operator | Mathematical Equation | Mapping |
|---|---|---|
| Convolution | $out(N_i, C_{out_j}) = bias(C_{out_j}) + \sum_{k=0}^{C_{in}-1} weight(C_{out_j}, k) \cdot input(N_i, k)$ | Tensor Core |
| ReLU | $ReLU(x) = max(0, x)$ | Vector Core |
| Linear | $y = xA^T + b$ | Tensor Core |
| Softmax | $Softmax(x_i) = \frac{exp(x_i)}{\sum_j exp(x_j)}$ | Vector Core |
| Batched MM | $out = \beta X_1 + \alpha(X_2 \times W)$ | Tensor Core |
| Allreduce | $out = Data1 + Data2$ | Vector Core |

FIG. 7

$$
\begin{aligned}
\min \quad & T \\
\text{s.t.} \quad & T \geq t_i + p_i & (\forall i) & \quad (1) \\
& p_i = y_i \cdot \ell_i + (1 - y_i) \cdot \ell_i & (\forall i) & \quad (2) \\
& x_{ij} + x_{ji} \leq 1 & (\forall i, j : i \neq j) & \quad (3) \\
& x_{ik} \geq x_{ij} + x_{jk} - 1 & (\forall i, j, k : i \neq j, j \neq k, i \neq k) & \quad (4) \\
& x_{ij} = 1 & (\forall i \prec j) & \quad (5) \\
& x_{ji} = 0 & (\forall i \prec j) & \quad (6) \\
& t_i + p_i \leq t_j & (\forall i \prec j) & \quad (7) \\
& t_i + p_i - H \cdot (1 - x_{ij}) \leq t_j & (\forall i, j \text{ incomparable}) & \quad (8) \\
& x_{ij} + x_{ji} \geq y_i & (\forall i, j \text{ such that... see caption}) & \quad (9) \\
& y_i + \sum_c z_{ic} = 1 & (\forall i : \text{TC-operator or VC-operator}) & \quad (10) \\
& z_{ic} = 0 & (\forall i : \text{TC-operator})(\forall c : \text{VC}) & \quad (11) \\
& z_{ic} = 0 & (\forall i : \text{VC-operator})(\forall c : \text{TC}) & \quad (12) \\
& y_i + \sum_{c: TC} z_{ic} = 1 & (\forall i : \text{fused operator}) & \quad (13) \\
& y_i + \sum_{c: VC} z_{ic} = 1 & (\forall i : \text{fused operator}) & \quad (14) \\
& z_{i,c} = z_{i, num_{TC} + c} & (\forall i : \text{fused operator})(\forall c = 1, ..., n) & \quad (15) \\
& x_{ij} + x_{ji} \geq z_{ic} + z_{jc} - 1 & (\forall i, j \text{ incomparable})(\forall c) & \quad (16)
\end{aligned}
$$

FIG. 8

INTEGRATED HARDWARE ARCHITECTURE AND DISTRIBUTION STRATEGY OPTIMIZATION FOR DEEP LEARNING MODELS

BACKGROUND

The use of deep neural networks (DNNs) has led to breakthroughs in various fields, including image and speech recognition, natural language processing, autonomous vehicles, and more, by enabling computers to automatically learn and extract intricate patterns and representations from large datasets. A DNN is a type of artificial neural network that consists of multiple hidden layers between the input and output layers. In a DNN, each layer contains neurons (also known as nodes or units), and each neuron is connected to neurons in the previous and subsequent layers. These connections are associated with weights and biases, which are learned during a training process. The use of multiple layers of neurons has enabled DNNs to learn and represent complex patterns and hierarchical features from input data.

DNNs are trained through a process called backpropagation and optimization. This process involves adjusting the weights and biases of the network's neurons to minimize a predefined loss function, which measures the difference between the network's predictions and the actual target values in the training data. Initially, the weights and biases of a DNN are set to small random values. A forward pass is then performed during which input training data is then fed into the network and is propagated through the layers using activation functions and weighted connections. Each neuron's output becomes the input for the next layer. This process continues until the final output layer produces an output. The difference between the DNN output and the target output is calculated using a loss function. Common loss functions include mean squared error (for regression tasks) and categorical cross-entropy (for classification tasks). A backward pass (i.e., backpropagation) is then performed which involves calculating the gradient of the loss one layer at a time starting with the output layer. The gradients are then used to update the weights and biases of the network based on an optimization algorithm, such as gradient descent or its variants. The process is then repeated until the DNN's performance on test data reaches a predetermined level (i.e., convergence), or until a predetermined number of epochs (i.e., cycles through the full training data set where each cycle includes a forward and a backward pass).

As DNNs have become larger, various strategies have been developed in an effort to improve the efficiency of training DNNs to reduce the computational resources required to train the model while at the same time increasing throughput. One such strategy is distributed training. Distributed training is typically achieved by implementing parallelism into the DNN, such as data parallelism, pipeline parallelism, and tensor model parallelism, to mitigate the large memory requirements of training while also boosting the throughput. Another strategy that has been used to increase efficiency of DNN training is determining the optimal hardware architecture to use to implement a DNN.

However, because the combined exploration of hardware architecture configurations and distribution schemes is a complex task, particularly when distributed execution across multiple devices is considered, these two strategies for increasing DNN training and inference efficiency are typically considered separately. The identification of optimal solutions for co-optimizing accelerator architecture and distributed execution strategy for deep learning training is therefore needed.

SUMMARY

In one general aspect, the instant disclosure presents a training optimization system for training a deep learning model. The training optimization system includes a processor and a memory in communication with the processor wherein the memory stores executable instructions that, when executed by the processor alone or in combination with other processors, cause the training optimization system to perform multiple functions. The functions include receiving input data which includes at least one training script for the deep learning model and defines an area constraint for accelerator optimization; extracting operator graphs pertaining to each layer in the deep learning model from the at least one training script using a graph extractor component; estimating a latency for each operator in each of the operator graphs using a runtime estimator component; generating a set of feasible architecture configurations that satisfy the area constraint using an architecture generator component; performing an evaluation process that includes: selecting a current feasible architecture configuration from the set of feasible architecture configurations having a largest area that has not been evaluated; providing the operator graphs, the latency for each operator in each of the operator graphs, and the current feasible architecture configuration to a solver component; using the solver component to solve an integer linear program (ILP) for each layer in the deep learning model based on the operator graphs and the latency of each operator in each of the operator graphs to generate an optimal schedule of operators to execute on a single accelerator architecture; using the solver component to solve a dynamic programming (DP) algorithm with reference to the optimal schedule of operators and the current feasible architecture configuration to determine a distribution strategy that identifies an optimal combination of pipeline parallel depth, data parallel width, and tensor model parallel width for executing the layers across multiple accelerators; providing feedback to the architecture generator component indicating a throughput for the current feasible architecture configuration; and repeating the evaluation process until a convergence is reached, the convergence being indicated by a decrease in the throughput for the current feasible architecture configuration; once the convergence has been reached, selecting an optimal architecture configuration from the feasible architecture configurations that has been evaluated and the distribution strategy determined for the optimal architecture configuration to use as a basis for an accelerator design for training the deep learning model.

In yet another general aspect, the instant disclosure presents a method of training optimization for a deep learning model that includes receiving input data which includes at least one training script for the deep learning model and defines an area constraint for accelerator optimization; extracting operator graphs pertaining to each layer in the deep learning model from the at least one training script using a graph extractor component; estimating a latency for each operator in each of the operator graphs using a runtime estimator component; generating a set of feasible architecture configurations that satisfy the area constraint using an architecture generator component; performing an evaluation process that includes: selecting a current feasible architecture configuration from the set of feasible architecture configurations having a largest area that has not been evaluated; providing the operator graphs, the latency for each operator in each of the operator graphs, and the current feasible architecture configuration to a solver component; using the solver component to solve an integer linear program (ILP) for each layer in the deep learning model based on the operator graphs and the latency of each operator in each of the operator graphs to generate an optimal schedule of operators to execute on a single accelerator architecture; using the solver component to solve a dynamic programming (DP) algorithm with reference to the optimal schedule of operators and the current feasible architecture configuration to determine a distribution strategy that identifies an optimal combination of pipeline parallel depth, data parallel width, and tensor model parallel width for executing the layers across multiple accelerators; providing feedback to the architecture generator component indicating a throughput for the current feasible architecture configuration; and repeating the evaluation process until a convergence is reached, the convergence being indicated by a characteristic change in performance for the current feasible architecture configuration; once the convergence has been reached, selecting an optimal architecture configuration from the feasible architecture configurations that has been evaluated and the distribution strategy determined for the optimal architecture configuration to use as a basis for an accelerator design for training the deep learning model.

In a further general aspect, the instant application describes a non-transitory computer readable medium on which are stored instructions that when executed cause a programmable device to perform functions of receiving input data which includes at least one training script for a deep learning model and defines an area constraint for accelerator optimization; extracting operator graphs pertaining to each layer in the deep learning model from the at least one training script using a graph extractor component; estimating a latency for each operator in each of the operator graphs using a runtime estimator component; generating a set of feasible architecture configurations that satisfy the area constraint using an architecture generator component; performing an evaluation process that includes: selecting a current feasible architecture configuration from the set of feasible architecture configurations having a largest area that has not been evaluated; providing the operator graphs, the latency for each operator in each of the operator graphs, and the current feasible architecture configuration to a solver component; using the solver component to solve an integer linear program (ILP) for each layer in the deep learning model based on the operator graphs and the latency of each operator in each of the operator graphs to generate an optimal schedule of operators to execute on a single accelerator architecture; using the solver component to solve a dynamic programming (DP) algorithm with reference to the optimal schedule of operators and the current feasible architecture configuration to determine a distribution strategy that identifies an optimal combination of pipeline parallel depth, data parallel width, and tensor model parallel width for executing the layers across multiple accelerators; providing feedback to the architecture generator component indicating a throughput for the current feasible architecture configuration; and repeating the evaluation process until a convergence is reached, the convergence being indicated by a characteristic change in performance for the current feasible architecture configuration; once the convergence has been reached, selecting an optimal architecture configuration from the feasible architecture configurations that has been evaluated and the distribution strategy determined for the optimal architecture configuration to use as a basis for an accelerator design for training the deep learning model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5 shows an example algorithm for generating architecture configurations to explore and to identify convergence based on hysteresis level.

FIG. 7 depicts a table showing a sample of operators, their mathematical equations, and core type mappings.

FIG. 8 is a list of example constraints for the integer linear program (ILP) implemented by the solver component of FIG. 6.

DETAILED DESCRIPTION

Figure 1:
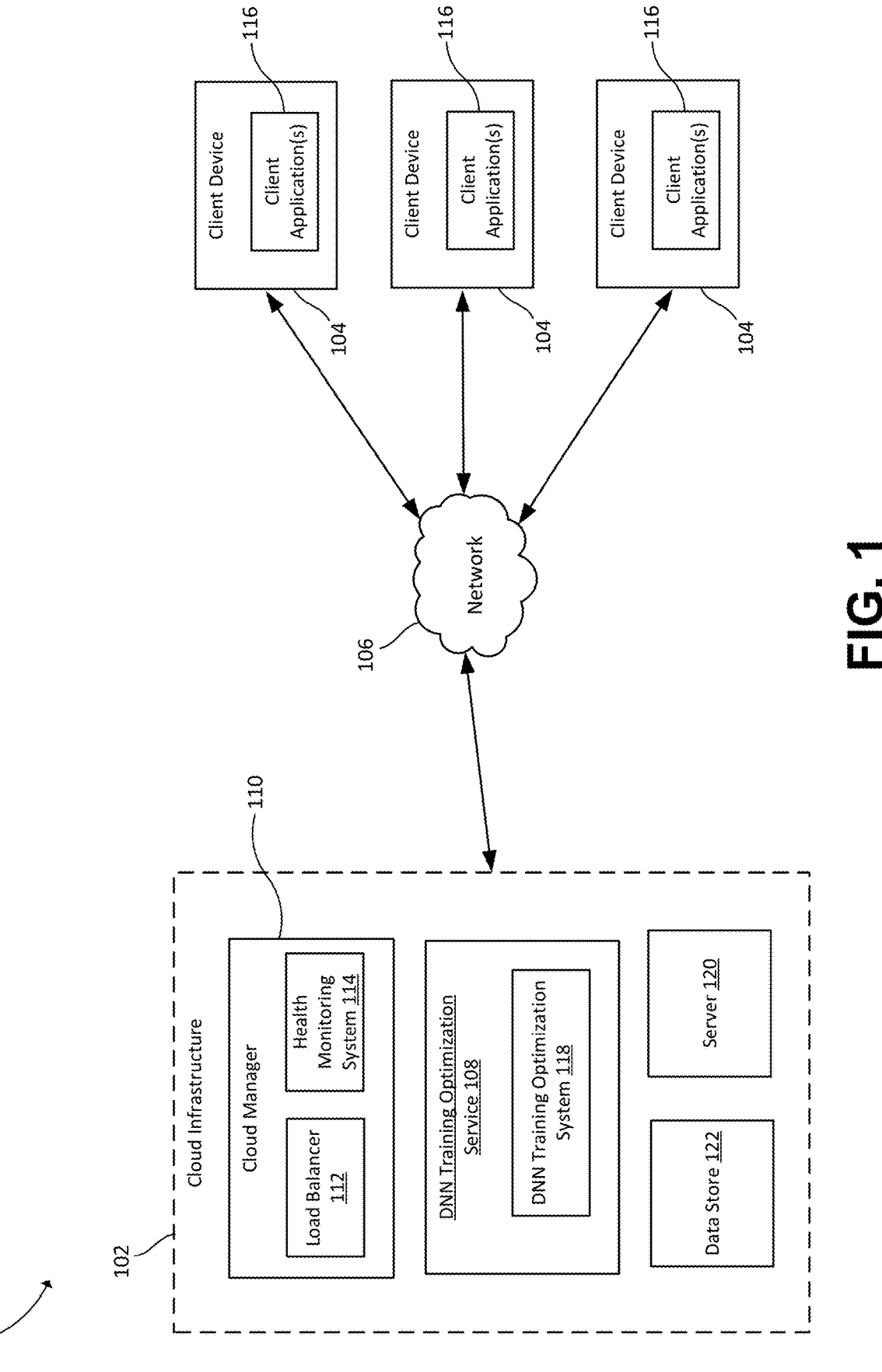
FIG. 1 is a diagram showing an example computing environment in which the techniques disclosed herein may be implemented.

The emergence of large DNNs has necessitated various degrees of parallelism, also referred to as distributed training, that uphold training fidelity while enhancing execution throughput. To address the memory overheads associated with training, pipeline parallel training has been adopted, which involves distributing layers across devices to minimize per-device storage requirements. In this type of parallelism, a mini-batch of training data is subdivided into micro-batches that devices process in a pipeline. Different pipelining strategies have been implemented which exhibit unique memory footprints due to variations in the order of micro-batches and the timing of pipeline flushes. In typical pipeline parallelism, a stage includes one or more layers. However, as the sizes of model operators (such as matrix multiplication) increase, there is a growing trend towards splitting a single layer across multiple devices. This approach is commonly referred to as intra-layer tensor model parallelism. For instance, one pipelining strategy distributes a transformer layer by partitioning the self-attention and MLP layers over several devices. Finally, since training is a throughput-centric task, it benefits from model replication if more devices are available. This can be achieved through data parallelism, which works in conjunction with pipeline parallelism and tensor model parallelism by replicating the entire flow multiple times.

Besides varying degrees of parallelism, certain runtime techniques are employed to further minimize the memory footprint, albeit at the expense of throughput. One such technique is activation recomputation. Instead of stashing the activations, they are recomputed during the execution of the backward pass. Although this approach significantly reduces memory requirements throughout training, it necessitates the execution of the forward pass twice.

Given the unique data flow, memory, and compute requirements of DNNs, their training is often executed on specialized hardware known as domain-specific hardware accelerators. Hardware accelerators are specialized computational resources designed to perform specific tasks with high efficiency. These accelerators are highly suitable for deep learning execution due to their ability to handle predictable computation and memory access patterns. As a result, many studies have proposed accelerator designs for either specific deep learning layers, such as Convolutions, transformers, or entire inference or training processes. Accelerator vendors have largely converged on two types of cores to execute the operators relevant to these models: tensor and vector cores. Tensor cores excel at handling high-throughput matrix operations, such as convolutions, General Matrix Multiplications (GEMMs), and batched matrix multiplications. Vector cores effectively perform point-wise and activation functions such as GELU, ReLU, Tanh, and vector-vector addition.

As noted above, the distribution strategy and hardware architecture utilized for DNN training were typically determined separately due to the complex nature of distributing execution across multiple devices in a computationally vast multi-dimensional space. Previously known strategies for optimizing hardware configurations for DNNs have typically only been concerned with inference tasks, i.e., tasks performed after the DNN has been trained and is presented with new data. However, this method can be inefficient due to the challenges presented by training, such as the fact that graphs are much larger than those used for inference, the optimizer and backward pass operators have distinct computational and memory requirements compared to forward pass operators, and training has a larger memory footprint. It's important to note that the design of such accelerators depends not only on the model and its execution graph, but also the distribution strategy. Previously known strategies for distributing a model across accelerators have typically presupposed a certain fixed domain-specific architecture. This information is then used to establish the optimal number of stages in a pipeline, the layers that constitute each stage in a pipeline, data parallel width, and tensor model parallel width for end-to-end training. However, this approach creates a cyclical dependency between device placement and architecture search optimization.

To address these technical problems, and more, in an example, this description provides technical solutions in the form of a DNN training optimization system that implements algorithmic solutions to solve the conjoined problem of accelerator architecture search and model partitioning for distributed training. The system makes the multi-dimensional optimization space of architecture search and device placement tractable by reducing the number of accelerators explored through area-based heuristics and employing a novel integer linear program (ILP), the complexity of which is dependent only on the number of operators in one layer. The ILP scheduling optimization also explores the partitioning of operators across cores, known as intra-operator parallelism. Despite the vast space, the ILP described herein requires significantly less time ($\leq 1$ hour) to perform the optimizations across all explored accelerator configurations than previously known implementations. Based on the optimal backward and forward pass latencies, the system leverages a novel dynamic programming (DP) approach to determine the device placement and model partitioning scheme.

The optimization schemes described herein for determining the optimal hardware architecture includes two main parts: first, the quantity and dimensions of each type of core (i.e., tensor and vector) to use are identified, and second, the execution schedule for these cores is determined. For each hardware configuration, the specific operator schedule for each layer is optimized using an ILP, which additionally decides which operators should be executed on multiple vector or tensor cores (intra-operator parallelism). Generally, ILPs produce optimal solutions but their applicability is hindered by inefficiency. To increase the efficiency of the ILP, the use of time-indexed variables is avoided so that its size depends only on the number of operators in each layer. This operator schedule is tailored for each layer (or layer slice when intra-layer parallelism is implemented) of the DNN. The output of the ILP for all layers and layer slice combinations is then passed to a novel DP algorithm to determine the best distribution strategy (optimal combination of data, pipeline, and tensor model parallelism) across the multiple devices. The evaluation of all possible architectural configurations, even with a predefined hardware template, can be computationally intensive as each exploration requires estimating the operator latencies within a layer, executing the ILP for every layer/layer slice to find the optimal latency and schedule of operators on an accelerator, and the DP optimization to determine the device placement strategy. To increase the efficiency of this process, a heuristic is introduced that establishes an early stopping criterion based on the accelerator area (e.g., size) and the performance metrics realized by the configurations already explored.

The technical solutions described herein address the technical problem of inefficiencies and difficulties in determining the optimal hardware architecture and optimal distribution strategy for efficient DNN training. The solutions can reduce the memory requirement while increasing throughput for a DNN or set of DNNs relative to previously known techniques.

FIG. 1 is a diagram showing an example computing environment 100 in which aspects of the disclosure may be implemented. Computing environment 100 includes cloud infrastructure 102, client devices 104, and a network 106. The network 106 includes one or more wired and/or wireless networks. In embodiments, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate.

The cloud infrastructure 102 is configured to provide one or more cloud computing services and/or distributed computing services to users over the network 106. The computing services include a DNN training optimization service 108 (explained in more detail below). Cloud infrastructure may provide other services, such as hosting applications, user authentication, file storage, system updates, and the like. Cloud infrastructure 102 includes one or more servers 120 which are configured to provide computational and storage resources for the DNN training optimization service 108. Servers are implemented using any suitable number and type of physical and/or virtual computing resources (e.g., standalone computing devices, blade servers, virtual machines, etc.). Cloud infrastructure 102 may also include one or more data stores 122 for storing data, programs, and the like for implementing and managing the DNN training optimization service 108. In FIG. 1, one server 120 and one data store 122 are shown although any suitable number of servers and/or data stores may be utilized.

Cloud infrastructure 102 includes a cloud manager 110 for managing various aspects of the cloud infrastructure, such as deploying, configuring, and managing physical and/or virtual machines. Cloud manager 110 includes a load balancer 112 for distributing requests and workloads among server farms and/or among servers of a server farm. The load balancer 112 utilizes parameters such as load, number of connections, and server performance, to determine where to distribute the requests and workloads. Cloud manager 110 also includes a health monitoring system 114 configured to monitor the health of physical and virtual resources. and identify faulty components so that remedial action can be taken.

Client devices 104 enable users to access the services provided by the cloud infrastructure 102 via the network 106, such as the DNN training optimization service 108. Client devices 104 can be any suitable type of computing device, such as personal computers, desktop computers, laptop computers, smart phones, tablets, gaming consoles, smart televisions and the like. Client devices 104 include one or more client (software) applications 116 that are configured to interact with services made available by cloud infrastructure 102. In some implementations, client applications 116 include dedicated applications installed on the client device and programmed to interact with one or more services provided by cloud infrastructure. In other embodiments, client applications 116 include general purpose applications, such as a web browser, configured to access services over the network 106.

Figure 2:
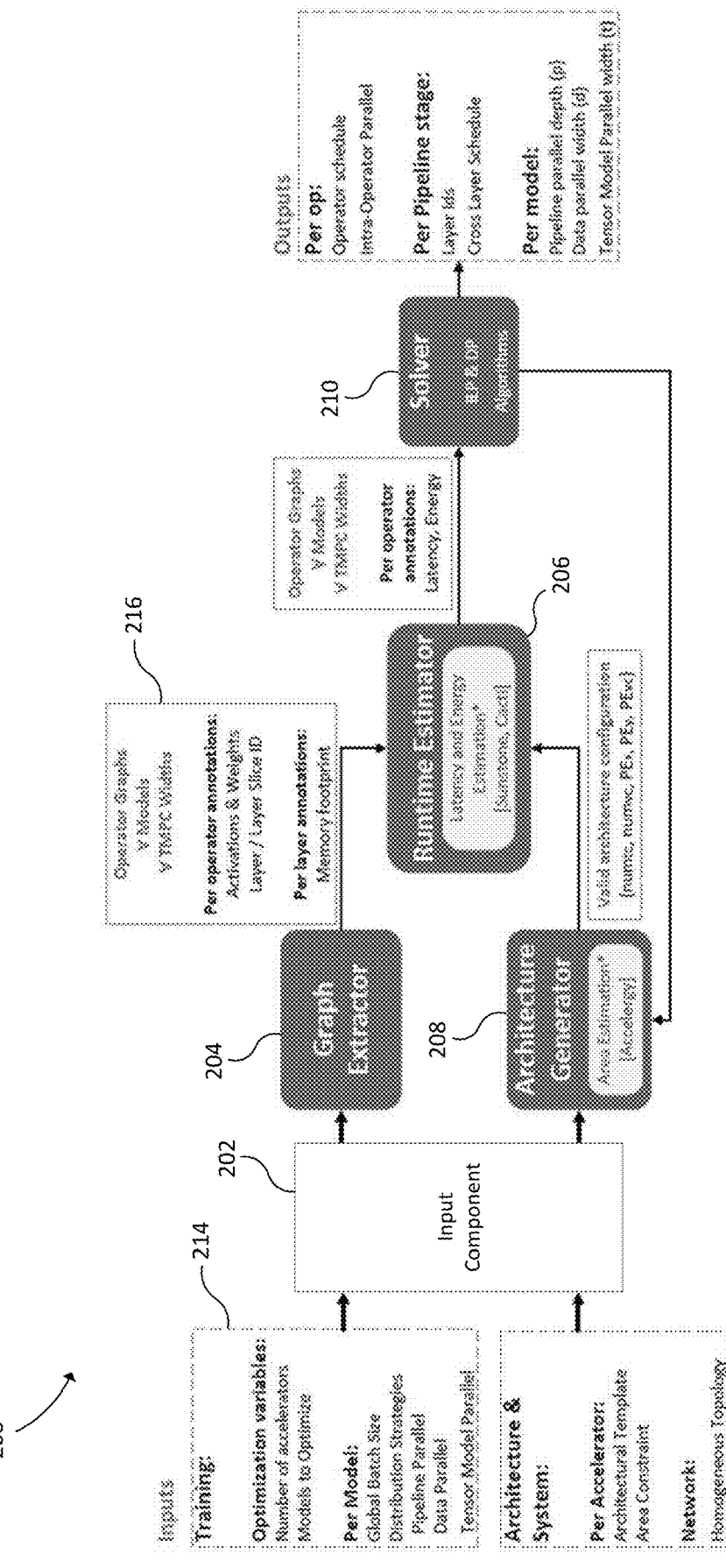
FIG. 2 is a schematic illustration of an example training optimization system in accordance with this disclosure.

In accordance with the disclosure, cloud infrastructure includes a DNN training optimization system 118 for providing the training optimization service. An example implementation of a DNN training optimization system 200 is shown in FIG. 2. DNN training optimization system 200 includes an input component 202, a graph extractor component 204, a runtime estimator component 206, an architecture generator component 208, and a solver component 210. These components are implemented on one or more computing devices (e.g., servers, personal computers, and the like). The input component 202 is configured to receive input data 214 that defines various parameters, model attributes, and architecture requirements for use by the system 200. In embodiments, the input component 202 includes a user interface that is displayed on a display of a computing device, such as client device, and that enables a user to input the input data 214.

In implementations, the input data includes one or more model training scripts. A training script is a computer program or code written to train a DNN. Training scripts define various characteristics and parameters of the model being trained and the process used to train the model. For example, training scripts may define the architecture of the model being trained. This includes specifying the layers, layer slices, operators, connections, and other components of the model. Training scripts may also define the loss function which is used to determine how well the model's performance compares to target performance and the optimization algorithm and variables used to update model parameters to minimize the loss function. Training scripts may also define global batch sizes for training and degrees of parallelism supported. The input data also defines design constraints, such as architectural template, accelerator size constraints, energy expenditure constraints, and/or model topology.

The graph extractor component 204 receives the one or more training scripts provided as input and extracts layer/layer slice information and operator information and generates graphs for each layer/layer slice and corresponding operator graphs for each layer/layer slice. In embodiments, operator graphs are Directed Acyclic Graphs (DAGs). The nodes in the graphs represent operators and connections between nodes indicate activation and weight information for the operators. In embodiments, graph extraction may be performed using a suitable program, function, and/or library. As an example, graph extraction may be performed using torch.fx which is a toolkit for developers. This toolkit enables graphs to be generated from code, such as training scripts. The graph extractor component provides the layer/layer slice graphs and operator graphs for an optimization operation to the runtime estimator component 206.

Figures 3, 4:
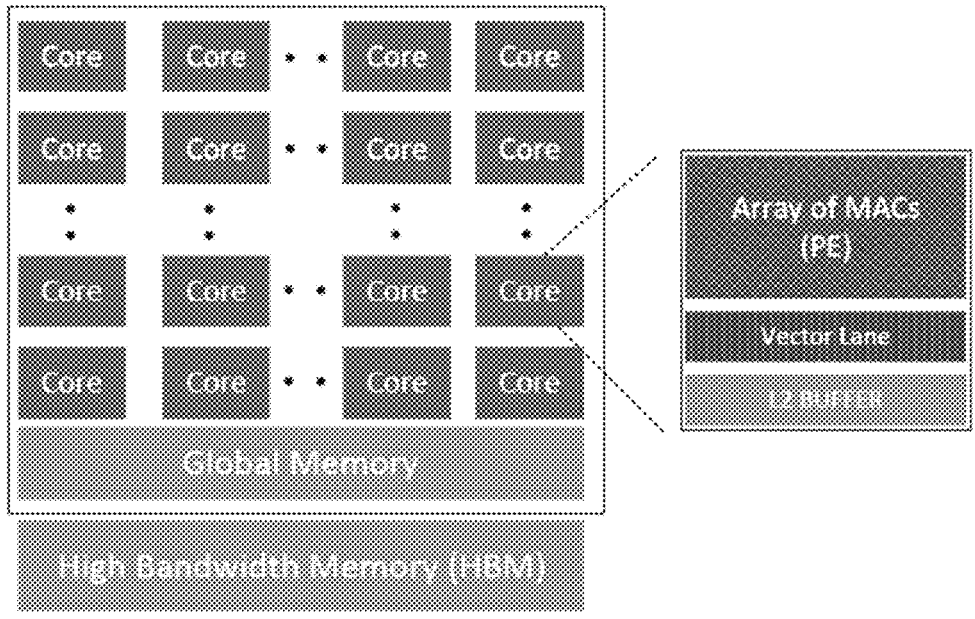
FIG. 3 shows an example accelerator template for use with the training optimization system of FIG. 2.
FIG. 4 is a table showing the bounds defining the architecture search based on an area constraint.

The architecture generator component 208 receives design constraints (e.g., area constraint, energy constraint, and the like) from the input data and selects a set of feasible architecture configurations for evaluation that satisfy the design constraints, such as the architecture area constraint and/or energy constraint. The architecture generator component 208 then selects an initial architecture configuration to provide to the runtime estimator component. For the purpose of this disclosure, architecture configurations are identified based on a predetermined accelerator template. An example accelerator template is shown in FIG. 3. The accelerator template defines the maximum number of cores, the global memory size, and high bandwidth memory (HBM) for an accelerator design. The template also defines the configuration of each type of core. For tensor cores, the core is an array of Multiply-Accumulate (MAC) units, and for vector cores, the core contains a vector lane. MACs are defined by x-y dimensions and vector lanes are defined by lane width. Each core also includes a buffer memory (e.g., L2 buffer).

In embodiments, each architecture configuration is represented as a 5-tuple that includes the following elements: $num_{tc}$, $num_{vc}$, $PEx$, $PEy$, and $PE_{vc}$, which respectively denote the number of tensor cores, number of vector cores, x- and y-dimensionality of the MAC units in each tensor core, and width of the vector lane in each vector core. Thus, for an architecture configuration that includes one tensor core having the maximum x-y dimensions of 256×256 and one vector core having the maximum vector lane width of 256, the 5-tuple is represented by $\{1, 1, 256, 256, 256\}$. A single model often has similar tensor dimensions throughout, as those are determined by static hyperparameters such as attention heads, sequence length, hidden size, batch size, etc. Thus, both activation operators and matrix multiplication operators share similar tensor sizes. Hence, to further reduce the search space, the vector and tensor core PE widths of architecture configurations are restricted so as to be identical, i.e., $PE_x$ is equal to $PE_{vc}$. The architecture generator component provides the current selected architecture configuration (e.g., 5-tuple) to the runtime estimator.

The runtime estimator component 206 receives the graphs from the graph extractor component 204 and the current selected architecture configuration and is configured to estimate at least one operator performance metric, such as latency per operator, energy expenditure per operator, and the like, for each node/operator in each operator graph. In some implementations, two latency estimates may be provided for each operator with one latency estimate being for use when intra-operator parallelization is implemented and the other latency estimate being for use when intra-operator parallelization is not implemented. The runtime estimator includes the operator metric estimates with the operator graphs, e.g., by annotation. Latency estimation and energy expenditure estimation may be performed in any suitable manner. As examples, latency estimation may be performed using Timeloop or Sunstone libraries, and energy expenditure may be performed using Cacti libraries.

Once operator metric estimates have been determined for each operator in each layer/layer slice and the graphs have been annotated, the runtime estimator component 206 provides the annotated graphs and the current selected architecture configuration to the solver component 210. The goal of the solver component 210 is to determine the device placement and the operator schedules in each layer or layer slice. The solver component may also determine other specifications for accelerator design, such as on-chip buffer size(s) and/or chip memory size(s). The solver component 210 also provides a feedback metric, such as throughput, end-to-end latency, overall energy expenditure, power budget, total cost of ownership (TCO, which includes cost of building the chip, energy consumption, and power budget) for the selected architecture configuration to the architecture generator component 208 which can be used later as the basis for selecting an optimal configuration for the system. The architecture component then selects the next feasible architecture configuration to be evaluated and the process is repeated.

Metric estimation, such as latency estimation and energy expenditure estimation, is a resource intensive task. To reduce the overhead of such estimates, the repetitive structure of large language models is leveraged by only running estimations for operators within a single layer or a layer slice at a time. All the non-repeat layers are estimated independently. To further reduce the overhead of estimations, a pruning scheme is employed to reduce the number of accelerator configurations that need to be evaluated by the system. The pruning scheme is based on the heuristic insight that there is typically a minimum and/or maximum value for a design constraint, such as chip size, chip area, energy consumption, and the like, which can be used to define at least one bound for feasible architectures. As one example, the configuration {1, 1, 256, 256, 256} could be considered a maximum chip area size for defining feasible architectures in some cases. In some cases, hardware may define maximum energy/power characteristics which could be used as the basis for defining at least one bound for feasible architectures. Once at least one bound for an architecture search has been determined, evaluation of feasible architectures can start at one bound and proceed from there in order of decreasing or increasing magnitude depending on whether the bound is a minimum or maximum bound. The bounds defining the architecture search based on an area constraint are illustrated in FIG. 4. In the case of FIG. 4, the feasible architecture configurations are evaluated in decreasing order of area starting with the largest area configuration. The process is repeated with the next smallest area configuration until convergence is reached.

The architecture generator component is configured to monitor the feedback metric from the solver component pertaining to the evaluated architecture configurations to determine when convergence occurs. In embodiments, convergence is identified when a feedback metric, such as throughput, for a currently selected architecture configuration changes relative to previously evaluated architectures. For example, when a feedback metric indicates that the throughput of the current evaluated architecture has diminished or is no longer following the trend set by previous evaluations, this may be used as an indication that further evaluations may not be necessary. Convergence may be identified using a predefined hysteresis level which defines the number of architecture configurations (e.g., 5, 10, etc.) having an uncharacteristic feedback metric, e.g., diminished throughput, that must occur before convergence is identified. An example algorithm for generating architecture configurations to explore and to identify convergence based on hysteresis level is shown in FIG. 5.

Once convergence has been reached, the architecture generator component selects one of the evaluated configurations as the optimal architecture configuration for the current optimization operation. Any suitable selection method and/or criteria may be used in selecting an optimal architecture configuration. In embodiments, parameters, such as minimum throughput, maximum size, minimum energy expenditure, minimum TCO, and the like, may be used as the basis for selecting an optimal architecture configuration. These parameters may be predetermined and programmed into the system and/or may be provided as user input.

Figure 6:
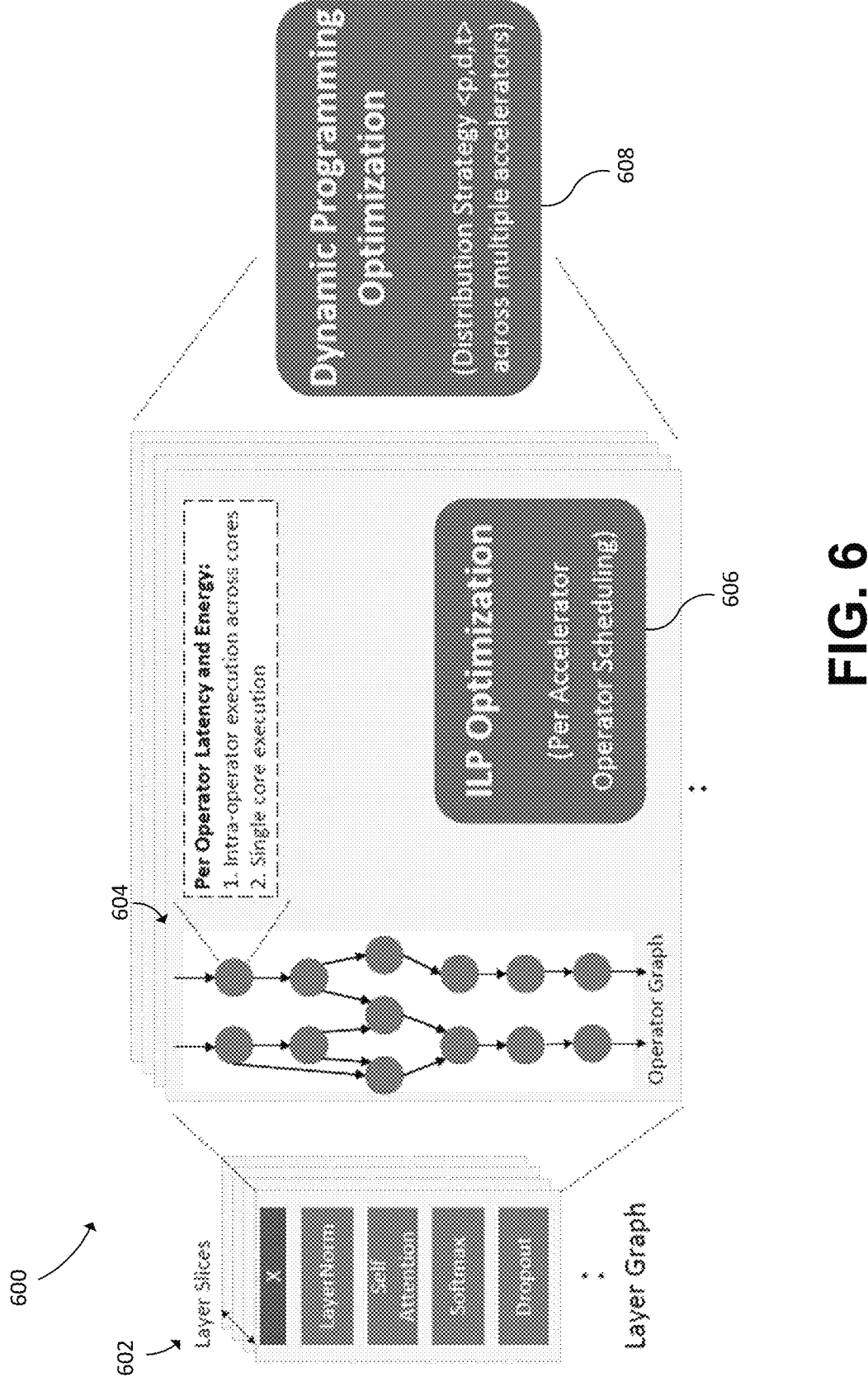
FIG. 6 shows an example implementation of a solver component of the training optimization system of FIG. 2.

An example implementation of a solver component 600 is shown in FIG. 6. The solver component 600 takes as input layer/layer slice graphs 602 and corresponding operator graphs 604. To accomplish this, the solver component 600 is configured to determine the device placement, and the operator schedules in each layer or layer slice. The solver component 600 includes an ILP optimization solver 606 (or ILP solver) and a DP optimization solver 608 (or DP solver). The ILP solver 606 is configured to determine the optimal accelerator operator scheduling. This data, combined with the memory footprint of each layer/layer slice, is then used by the DP solver to determine the most effective distribution strategy across multiple accelerators. In embodiments, the distribution strategy identifies the optimal combination of data, pipeline, and tensor model parallelism (i.e., $<p, d, t>$) to use in training a DNN.

The ILP solver 606 executes an ILP for every selected architecture configuration, as described by the 5-tuple $\{num_{tc}, num_{vc}, PE_x, PE_y, PE_{vc}\}$, and for every layer/layer slice across all possible tensor model parallel widths of a model. Tensor model parallel widths refers to the number of accelerators used in the tensor model parallelization of a layer. At this stage, memory usage (of the accelerator's High Bandwidth Memory, HBM) is not a concern, as it is independent of the scheduling of the layer's operator graph. The objective is to schedule a layer or layer slice's operator graph on a single accelerator in order to minimize latency.

The ILP explores the search space of schedules under the following conditions:

if intra-operator parallelism is utilized for a tensor-core operator, then no other operators are in execution, at any given moment, if intra-operator parallelism is utilized for a fused operator, then no other operators, regardless of type, are in execution.

These assumptions are made because the Global Buffer has a certain bandwidth that can only feed the cores in a pipelined fashion. Therefore, if an operator is executing in intra-operator parallel mode, the entire Global Buffer bandwidth is consumed by that operator.

The input to the ILP is an operator DAG (V, E) of a layer/layer slice where Vis the number of operators (i.e., nodes) and E is the number of edges in the graph. Each node includes architecture-dependent latency estimates (as provided by the runtime estimator component). As noted above, two latency estimates may be provided with one latency estimate being for cases when intra-operator parallelization is used and the other latency estimate being for cases when intra-operator parallelization is not used. Each operator in the graph is categorized as either tensor-core, vector-core, or fused. FIG. 7 depicts a table showing a sample of operators, their mathematical equations, and core type mappings. The edges E of the graph represent dependencies. These edges signify data transfer to and from HBM, which is accounted for in the operator estimates.

In deep learning, a matrix multiplication operator is often directly followed by an activation function, such as Relu (rectified linear unit). An optimization technique called operator fusion enables intermediate activations between certain operators to be directly forwarded from tensor to vector core, or vice versa, without passing through HBM. On the hardware, such an operator is executed on a fused core equipped with both a MAC unit and a vector lane. For the purposes of this disclosure, a tensor core operator followed by a vector core operator is considered a fused operator and can only be executed on a fused core. For the purposes of this disclosure, tensor cores are numbered from 1 to $num_{TC}$, and vector cores from $num_{TC}+1$ to $num_{TC}+num_{VC}$. The first min ($num_{TC}$, $num_{VC}$) tensor cores are paired with the first min($num_{TC}$, $num_{VC}$) vector cores. A fused operator, in the absence of intra-operator parallelism, runs on one such pair, i.e., on tensor core c and on vector core $num_{TC}+c$, for some $c \in \{1, \ldots, min(num_{TC}, num_{VC})\}$.

FIG. 8 shows an example list of constraints for the ILP. The ILP variables used in the constraints are enumerated as follows:

$t_i \in R_+$ for $i \in V$: start time of operator i, $p_i \in R_+$ for $i \in V$: latency of operator i (defined by constraint (2)), $T \in R_+$: the makespan (overall latency) of the schedule (defined by constraint (1)), $y_i \in \{0, 1\}$ for $i \in V$: one if operator i is intra-operator parallelized, zero otherwise, $x_{ij} \in \{0, 1\}$ for i, $j \in V$, $i \neq j$: if this is one, i finishes before j begins, $z_{ic} \in \{0, 1\}$ for $i \in V$ and $c = 1, \ldots, num_{TC}+num_{VC}$: 1 if operator i is assigned to core c.

A strict partial order ≺ is defined as the transitive closure of the DAG (V,E). If i≺j, operator i must finish before j can begin, and only incomparable operators can potentially execute simultaneously. The variables $x_{ij}$ define another strict partial order, which lies between ≺ and the partial order given by the execution time intervals of operators in the found schedule. Specifically:

if i≺j then xij=1 (constraint (5)), if $x_{ij}$=1, then i finishes before j starts (constraints (7) and (8)).

If $x_{ij}+x_{ji}$=1, then i and j cannot execute in parallel. The x variable enforces the condition that when intra-operator parallelized operators are executing, other operators (of the same type) should not be executing. This is done in constraint (9) which requires that if $y_i$=1 (i.e., i is intra-operator parallelized), then one of the following must be true: $x_{ij}$=1 or $x_{ji}$=1, which implies via constraint (8) that i and j cannot execute in parallel. In constraint (8), H is a large number. Intuitively, this constraint should be read as: $(t_i+p_i)^*x_{ij} \leq t_j$ (which would be a quadratic constraint). Note that when $x_{ij}$=1, constraint (8) becomes $t_i+p_i \leq t_j$, and when $x_{ij}$=0, constraint (8) becomes vacuous since the left-hand side is negative.

Due to use of the x-variables that encode a strict partial order that is in-between the input partial order ≺ and the partial order induced by the computed solution, the necessity of using time-indexed variables is circumvented. Therefore, the ILP is very tractable. An additional optimization may be employed that involves removing the z-variables and all constraints that utilize them. The proposed ILP has two sets of constraints:

ensuring the order and dependencies in the operator graph, ensuring the resource constraint imposed by the accelerator configuration (that not too many cores are used at the same time).

The number of variables in the ILP depends on the number |V| of nodes in the layer or layer slice, as well as the number of cores in the accelerator (both tensor and vector cores). Namely, it is $O(|V|^2+|V|(num_{TC}+num_{VC}))$. The z-variables essentially ensure that the breadth of parallel execution is not excessive, i.e., it doesn't employ more cores than available.

However, it is often the case that this restriction is not necessary. To optimize the ILP based on this information, the z-variables and all constraints involving them are removed, and the ILP is solved. The schedule arising from the ILP solution (start executing every operator i at time $t_i$) is generated. The number of vector cores and tensor cores used at any time in the schedule is checked to see if the schedule ever uses more of either type of core than is available at any time. If the schedule does not require the use of more cores of either type than are available, the optimal solution is found. Otherwise, it is necessary to add back the z-variables and constraints corresponding to the type (vector or tensor) of cores for which the resource constraint has been violated. The ILP is then solved again. Note that whenever this happens, it must be the case that there is significant branching in the model (i.e., more nodes executing in parallel than the number of tensor or vector cores). This implies that the number of cores is smaller than the size |V| of the operator graph of the layer (or layer slice). Therefore, the number of variables in the ILP is always at most $O(|V|^2)$. The ILP runtimes are also only a small fraction of the entire end-to-end compute time.

The output of the ILP for all layers and layer slice combinations is passed to the DP solver which executes a DP algorithm to determine the best distribution strategy (optimal combination of data, pipeline, and tensor model parallelism) across the various devices. For a given accelerator architecture A, number of accelerators K, and a workload W, the objective of the DP solver is to form a high-throughput pipelined schedule for the workload. For this problem, the workload is a DAG with a layer granularity (i.e., V is the set of layers of the DNN). It is assumed that the batch (or mini-batch) size and the microbatch size are fixed. B is the number of microbatches in a batch. It is further assumed that the user specifies whether activation recomputation is used or not. If yes, then it is used throughout the entire workload, with a stage granularity (that is, only the input activations of a stage are stored, not of each layer, and compute the forward-plus-backward pass of the entire stage, materializing all the intermediate activations for a single microbatch during this time). In this algorithmic problem, the goal is to determine:

the degree d of data parallelism (number of parallel pipelines), with d|K and d|B.

a number s of stages, and a sequence of subgraphs/stages $S_1 \ldots, S_s$, each with a number of associated accelerators $K_1 \ldots K_s$, such that:

$S_1, \ldots, S_s$ form a disjoint partition of the set of layers: $V = S_1 \cup \ldots \cup S_s$.

each $S_i$ is a contiguous subgraph, and when each $S_i$ is contracted, the resulting graph is still a DAG, for which (1, 2 . . . , s) is a topological ordering (more simply: there are no edges from $S_i$ to $S_j$ with i>j), we have enough accelerators:

$$d \cdot \sum_{i=1}^{S} K_i \le K,$$

for each stage i=1 . . . , s, a low-latency schedule to execute the layers in the subgraph $S_i$ using $K_i$ accelerators (that fits in accelerator memory).

The DP solver builds the pipeline stage by stage, starting from the last stage and ending with the first. To do so, it works on downsets: downward-closed sets of layers. The dynamic programming table that we will compute is dp'[D] [k][s]:=minimum max-load of any accelerator, when optimally partitioning downset D over s stages using k accelerators, with degree t of tensor model parallelism. Note that at this level only a single (data-parallel) pipeline is considered. This is computed for all downsets D (except the entire set V) and numbers k, s and t. The dynamic programming recursion is as follows:

$$dp'[D][k][s] = \min_{downset\ D' \subseteq D} \min_a \max(dp'[D'][k-a][s-1], load'(D\backslash D', a, s))$$

where:

a new stage is being placed with layer set D\D' and using a accelerators, load'(S, a, s) is defined as the load (optimal, minimized latency) of a stage with layer set S, using a accelerators, that is the s-th stage from the end of the pipeline, using t-wise tensor model parallelism. This is needed to compute the memory needed to store stashed data for in-flight microbatches.

the remaining subproblem is to place the layer set D' over s−1 stages using k−a accelerators.

The final result is computed by optimizing over d, s, t, and the first stage (which in the dynamic program is the last stage to be formed). Namely, the final time per batch F is computed as:

$$F := \min_d \min_s \min_t \min_{D'} \min_a \left[\left(\frac{B}{d} + s - 1\right) \cdot \right.$$
$$\left. \max\left(dp'[D']\left[\frac{K}{d} - a\right][s-1], load'(V\backslash D', a, s)\right)\right].$$

Regarding the final time per batch:

d parallel pipelines are formed. Thus, there are K/d accelerators to use per pipeline.

A number a accelerators is used (per pipeline) for the first stage, which has layer set V\D', where D' is the downset. In an s stage pipeline, it is the s-th stage from the end, and all s values are looped over.

The maximum load of any accelerator is given by the max expression.

In both recursions (for dp' and for F), the range of a values can be limited.

The DP algorithm makes assumptions to solve the model partitioning problem. One assumption involves pipeline flushes. The pipelining scheme follows a flushing schedule similar to PipeDream-Flush/DeepSpeed 1F1B. This approach differs from previous methods utilizing dynamic programming, where non-flushing schedules like Pipe-Dream-2BW were considered. In a non-flushing schedule, the time taken per microbatch equals the maximum load (single-microbatch latency) of any stage. As such, previous methods have concentrated on minimizing this max-load. However, a major difficulty regarding flushing schedules is that the flush time cannot be entirely disregarded. In the DP algorithm described herein, the flush time is taken into account by calculating the time taken per patch by multiplying the max-load by a factor $$\frac{B}{d} + s - 1.$$

Note that B/d is the per-pipeline batch size (number of microbatches per pipeline). This approximation is lossless if all stages have the same load.

Another assumption involves gradient synchronization communication costs. AllReduce operation communication, which synchronizes gradients between data-parallel replicas, takes place during the flush period. Throughout this time, all stages, except for the first, remain idle while the backward pass propagates. It is assumed that this period is sufficient for the communication to successfully complete. However, for the first stage, synchronization does cause a slowdown, which is accounted for by adding $$4 \cdot \frac{d-1}{d} \cdot \frac{\text{size of weights in first stage}}{\text{bandwidth}}$$

to the execution time of the batch. The bandwidth here is the same as the one used to estimate Allreduce operator cost for tensor model parallelism.

It is important to note that, since the load subroutine will be invoked for all feasible settings of S, t, a, s, it must be highly efficient. It is designed to compute the maximum load of any of the a accelerators, and it also provides information about every layer that needs to be relayed downstream (such as latency, memory usage, and so on). The second function of the load subroutine is to calculate memory usage. If the memory limit (as defined by accelerator HBM size) is surpassed, load should return +∞. Ideally, for every s, the schedule with the least latency is determined such that no accelerator exceeds the memory limit. However, this complex problem does not need to be solved. Instead, the algorithm attempts to identify the overall lowest-latency schedule, and calculate its memory usage.

As in all of test workloads, the layer graph (i.e., the operator graph of the full DNN, where operators belonging to each layer or layer slice have been contracted into a single node) is linear (i.e., contains a Hamiltonian path—this is consistent with the layer structure of large language models), the load only needs to be computed for these layers because there are no optimization decisions to be made. The forward pass is focused on for simplicity; the computation for the backward pass (with or without forward pass recomputation) is analogous.

A topological ordering of S (recall that S is a contiguous subgraph of layers) is fixed. Let S={L1 . . . . L$_l$} (in that topological order). Each layer comes with a single, optimized schedule to execute it, which is computed as schedule (L$_i$). An "object-oriented" notation is used to access the quantities related to this schedule, such as schedule (L$_i$).latency_fw. Note that quantities related to L$_i$, Li.weights_size, are not dependent on the schedule.

The layers are scheduled one by one. Each layer begins at the earliest time that all of its predecessor have been completed, and all incoming activations have been transferred over the edges of the graph from other devices. The transfer costs on those edges that come from outside of the stage are considered here. It is assumed that the network has a flat structure, where transmitting X bytes from any accelerator to any other accelerator takes time X/bandwidth. As a result, the finishing time of the layer is the starting time plus schedule (Li).latency_fw.

If activation recomputation is employed, it is performed at a stage level, meaning that all intermediate activations within the stage are materialized during the forward pass recomputation. This implies that peak memory usage is reached at the end of that recomputation, specifically when the pipeline is in a steady state and the stage has stored data for the full number of in-flight microbatches. At this point, the accelerator memory (HBM) contains the following:

model weights, accumulated gradient updates (of the same size as the model weights), optimizer state, all intermediate activations, stashed data for in-flight microbatches; if activation recomputation is used, then these are the stage's input activations, otherwise, these are all intermediate activations.

The following property of the implemented pipelining scheme determines the memory usage: in the steady state of the pipeline, for a stage that is the s-th stage from the pipeline's end, it's necessary to stash data for at most s−1 in-flight microbatches. These are the microbatches for which the forward pass has already been computed on this stage, but the backward pass has not yet been processed. The PipeDream-Flush scheme adheres to the property that computations can be lazily scheduled, thereby satisfying the property. Here, the term "data" varies based on whether activation recomputation is being used: if it's not being used, the "data" refers to all forward activations, and if it is being used, "data" refers to the input activations of the stage. For GPipe schedules, s−1 should be replaced with the total number of batches per pipeline, i.e., B/d.

Therefore, the memory usage can be modeled as:

$$\sum_{L_i \subseteq S} (2 \cdot L_i \cdot \text{weights\_size} + L_i \cdot \text{optimizer\_size} + L_i \cdot \text{activations\_size}) +$$

$$(s-1) \cdot \text{stashed\_data}$$

where, if activation recomputation is used, $$\text{stashed\_data} = \sum_{u, v \in \delta^-(S)} \text{size}(u, v),$$

and
where $\delta^-$(s) denotes the set of incoming edges of S, and otherwise $$\text{stashed\_data} = \sum_{L_i \in S} L_i \cdot \text{activation\_size}.$$

Note that the computation costs and communication costs do not depend on s (except when s=1 as activation recomputation is not required for the last stage). Moreover, the memory usage only depends on s in an affine way. Namely, when s increases by one, the peak memory usage rises precisely by the amount of stashed_data. This allows the runtime of the load computation to be optimized by reusing the results across all s values. Indeed, rather than explicitly computing the quantity load$^r$(S, a, s) for all t. S, a, s, a pair load$^r$(S, a) may be returned that comprises: (1) the usual output of load (maximum latency over the a accelerators), and (2) the maximum s for which the found schedule fits in the memory of every accelerator.

In designing the DNN training optimization system, the following assumptions were made:

Network topology and bandwidth. A homogeneous network is assumed where all devices communicate with each other. Hierarchical or multi-level network topologies are not considered within the scope of this disclosure. This assumption extends to collective operations across both tensor model parallel and data parallel frameworks.

Assumptions for scheduling operators in a layer on the accelerator using ILP. It is posited that the accelerator's Global Buffer can support parallel operator execution across multiple cores. Nonetheless, empirical observation indicates that ILP often selects intra-operator parallel mode for larger operators, wherein the Global Buffer utilizes a pipelined strategy to feed cores.

Megatron tensor model parallel assumption. The tensor model parallel assumption of Megatron style execution is assumed. Here, for every TMP width, all the layers that can be split are split across the entire model.

Figure 9:
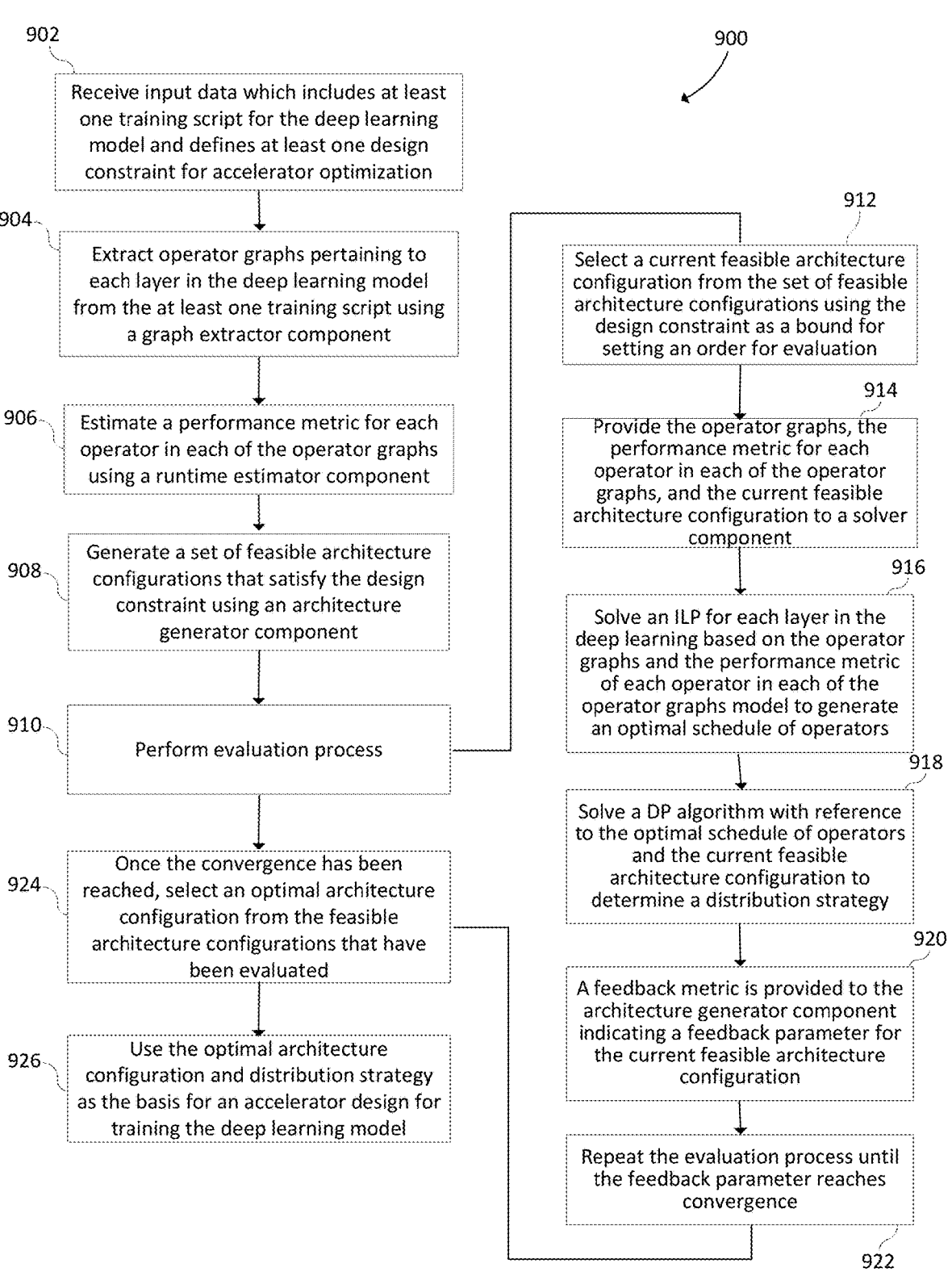
FIG. 9 is a flowchart of an example method for training optimization for a deep learning model.

FIG. 9 shows a flowchart of an example method 900 of co-optimizing architecture configurations and distribution strategies for a deep learning model. The method begins with receiving input data which includes at least one training script for the deep learning model and defines a design constraint for accelerator optimization (block 902). Operator graphs pertaining to each layer in the deep learning model are then extracted from the at least one training script using a graph extractor component (block 904). A performance metric, such as latency and/or energy expenditure, for each operator in each of the operator graphs is estimated using a runtime estimator component (block 906). A set of feasible architecture configurations that satisfy the design constraint is generated using an architecture generator component (block 908). An evaluation process is then performed (block 910). The evaluation process includes selecting a current feasible architecture configuration from the set of feasible architecture configurations using the design constraint as a bound for setting an order of evaluation (block 912); providing the operator graphs, the performance metric estimates for each operator in each of the operator graphs, and the current feasible architecture configuration to a solver component (block 914); using the solver component to solve an integer linear program (ILP) for each layer in the deep learning model based on the operator graphs and the performance metric of each operator in each of the operator graphs to generate an optimal schedule of operators to execute on a single accelerator architecture (block 916); and using the solver component to solve a dynamic programming (DP) algorithm with reference to the optimal schedule of operators and the current feasible architecture configuration to determine a distribution strategy that identifies an optimal combination of pipeline parallel depth (p), data parallel width (d), and tensor model parallel width (t) for executing the layers across multiple accelerators (block 918). The DP algorithm enables determinations to be made regarding the partitioning of the layer graph into pipeline parallel stages, and, for each stage, the number of accelerators and layer-level schedule used to process it. A feedback metric is provided to the architecture generator component indicating a feedback parameter, such as throughput, energy consumption, power budget, TCO, and the like, for the current feasible architecture configuration (block 920). The evaluation process is repeated until a convergence is reached (block 922). The convergence is indicated by a characteristic change in the feedback metric, such as diminished throughput, for the current feasible architecture configuration and/or for the current feasible architecture configuration and a predetermined number of previously evaluated architecture configurations (i.e., hysteresis). Once the convergence has been reached, an optimal architecture configuration is selected from the feasible architecture configurations that have been evaluated (block 924). The optimal architecture configuration and the distribution strategy determined for the optimal architecture configuration may then be used as an accelerator chip design which can be used to train the deep learning model (block 926).

Figure 10:
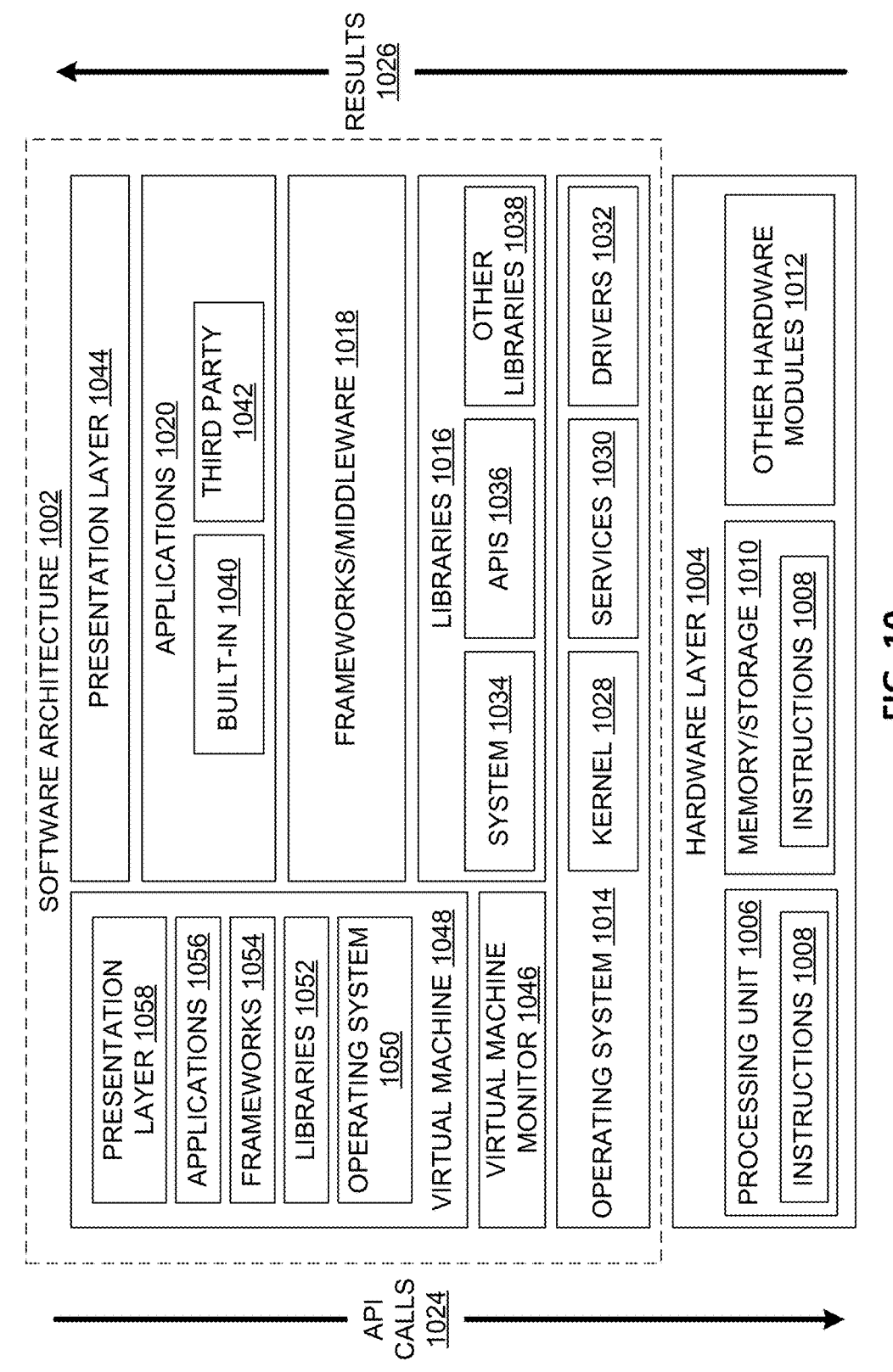
FIG. 10 is a block diagram showing an example software architecture, various portions of which may be used in conjunction with various hardware architectures herein described, which may implement any of the described features.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture, and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions

1008 held by processing unit 1006 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
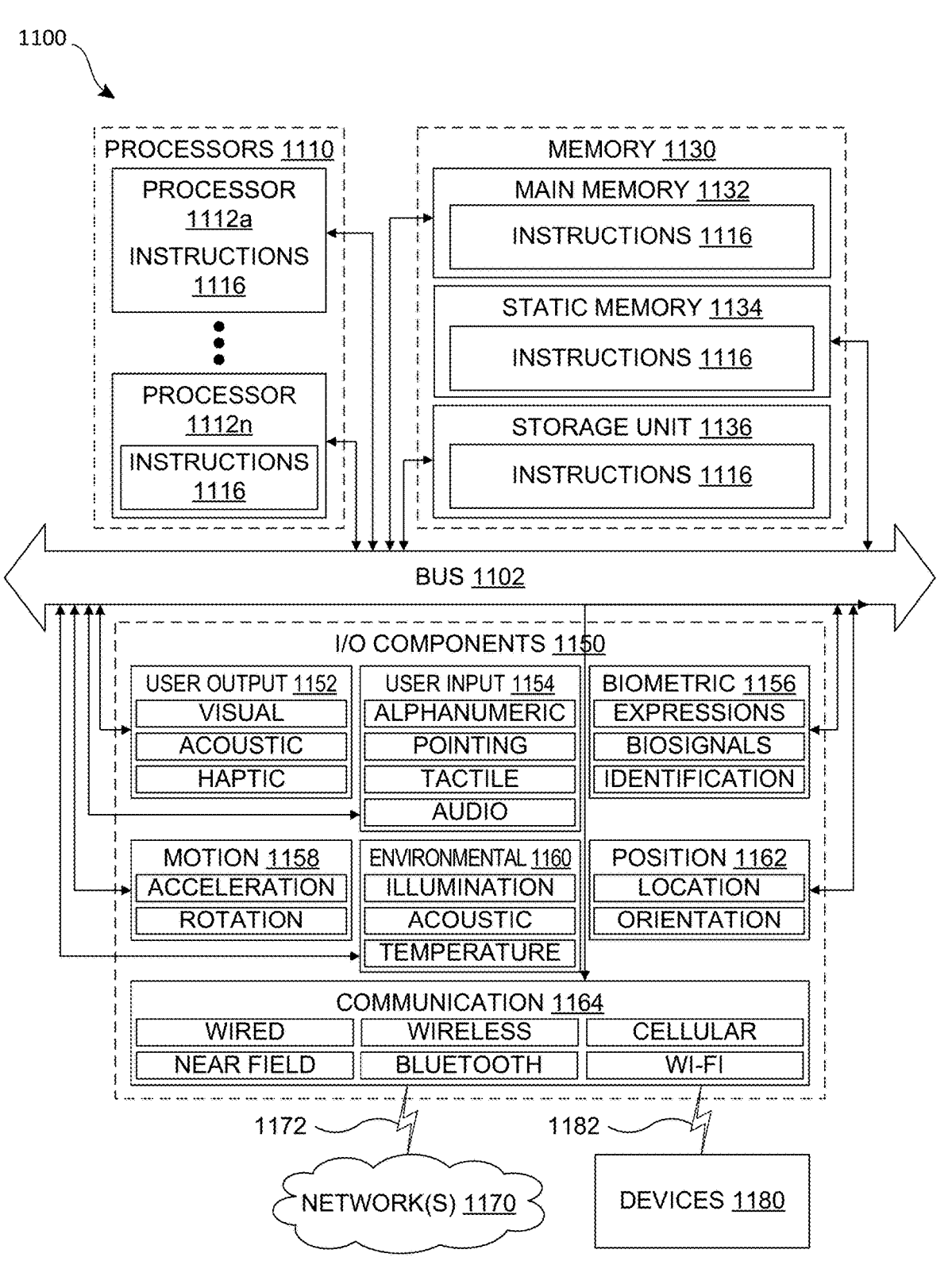
FIG. 11 is a block diagram showing components of an example machine configured to read instructions from a machine-readable medium and perform any of the features described herein.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1164, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A training optimization system for training a deep learning model, the training optimization system comprising:
  a processor; and
  a memory in communication with the processor, the memory comprising executable instructions that, when executed by the processor alone or in combination with other processors, cause the training optimization system to perform functions of:
  receiving input data which includes at least one training script for the deep learning model and defines an area constraint for accelerator optimization;
  extracting operator graphs pertaining to each layer in the deep learning model from the at least one training script using a graph extractor component;
  estimating a latency for each operator in each of the operator graphs using a runtime estimator component;
  generating a set of feasible architecture configurations that satisfy the area constraint using an architecture generator component;
  performing an evaluation process that includes:
    selecting a current feasible architecture configuration from the set of feasible architecture configurations having a largest area that has not been evaluated;
    providing the operator graphs, the latency for each operator in each of the operator graphs, and the current feasible architecture configuration to a solver component;
    using the solver component to solve an integer linear program (ILP) for each layer in the deep learning model based on the operator graphs and the latency of each operator in each of the operator graphs to generate an optimal schedule of operators to execute on a single accelerator architecture;
    using the solver component to solve a dynamic programming (DP) algorithm with reference to the optimal schedule of operators and the current feasible architecture configuration to determine a distribution strategy that identifies an optimal combination of pipeline parallel depth, data parallel width, and tensor model parallel width for executing the layers across multiple accelerators;
    providing feedback to the architecture generator component indicating a throughput for the current feasible architecture configuration; and
    repeating the evaluation process until a convergence is reached, the convergence being indicated by a decrease in the throughput for the current feasible architecture configuration;
  once the convergence has been reached, selecting an optimal architecture configuration from the feasible architecture configurations that has been evaluated and the distribution strategy determined for the optimal architecture configuration to use as a basis for an accelerator design for training the deep learning model.
Item 2. The training optimization system of item 1, wherein the operator graphs comprise Directed Acyclic Graphs (DAGs) with each node in each of the operator graphs corresponding to an operator and edges between operators defining weights and activation functions pertaining to the operators.
Item 3. The training optimization system of any of items 1-2, wherein the ILP determines which operators should be executed on multiple vector cores or multiple tensor cores to implement intra-operator parallelism.
Item 4. The training optimization system of any of items 1-3, wherein the ILP includes predefined constraints, the predefined constraints defining a first strict partial order as a transitive closure of a DAG being evaluated, and wherein the predefined constraints define a second strict partial order which lies between the first strict partial order and a partial order given by execution time intervals of operators in the optimal schedule determined for the DAG, the second strict partial order obviating a need for time-indexed variables in the ILP.

Item 5. The training optimization system of any of items 1-4, wherein the predefined constraints are selected to ensure a resource constraint imposed by the current feasible architecture configuration is not exceeded.

Item 6. The training optimization system of any of items 1-5, wherein the DP algorithm determines a pipeline schedule for pipeline parallelism stage by stage starting from a last stage and ending with a first stage based on downsets which are downward-closed sets of layers.

Item 7. The training optimization system of any of items 1-6, wherein the DP algorithm determines a degree of data parallelism, a number of stages and a sequence of contiguous subgraphs, and, for each of the stages, a low-latency schedule to execute layers in the subgraphs using a predetermined number of accelerators.

Item 8. A method of training optimization for a deep learning model, the method comprising:

receiving input data which includes at least one training script for the deep learning model and defines an area constraint for accelerator optimization;

extracting operator graphs pertaining to each layer in the deep learning model from the at least one training script using a graph extractor component;

estimating a latency for each operator in each of the operator graphs using a runtime estimator component;

generating a set of feasible architecture configurations that satisfy the area constraint using an architecture generator component;

performing an evaluation process that includes:

selecting a current feasible architecture configuration from the set of feasible architecture configurations having a largest area that has not been evaluated;

providing the operator graphs, the latency for each operator in each of the operator graphs, and the current feasible architecture configuration to a solver component;

using the solver component to solve an integer linear program (ILP) for each layer in the deep learning model based on the operator graphs and the latency of each operator in each of the operator graphs to generate an optimal schedule of operators to execute on a single accelerator architecture;

using the solver component to solve a dynamic programming (DP) algorithm with reference to the optimal schedule of operators and the current feasible architecture configuration to determine a distribution strategy that identifies an optimal combination of pipeline parallel depth, data parallel width, and tensor model parallel width for executing the layers across multiple accelerators;

providing feedback to the architecture generator component indicating a throughput for the current feasible architecture configuration; and repeating the evaluation process until a convergence is reached, the convergence being indicated by a characteristic change in performance for the current feasible architecture configuration;

once the convergence has been reached, selecting an optimal architecture configuration from the feasible architecture configurations that has been evaluated and the distribution strategy determined for the optimal architecture configuration to use as a basis for an accelerator design for training the deep learning model.

Item 9. The method of item 8, wherein the operator graphs comprise Directed Acyclic Graphs (DAGs) with each node in each of the operator graphs corresponding to an operator and edges between operators defining weights and activation functions pertaining to the operators.

Item 10. The method of any of items 8-9, wherein the ILP determines which operators should be executed on multiple vector cores or multiple tensor cores to implement intra-operator parallelism.

Item 11. The method of any of items 8-10, wherein the ILP includes predefined constraints, the predefined constraints defining a first strict partial order as a transitive closure of a DAG being evaluated, and wherein the predefined constraints define a second strict partial order which lies between the first strict partial order and a partial order given by execution time intervals of operators in the optimal schedule determined for the DAG, the second strict partial order obviating a need for time-indexed variables in the ILP.

Item 12. The method of any of items 8-11, wherein the predefined constraints are selected to ensure a resource constraint imposed by the current feasible architecture configuration is not exceeded.

Item 13. The method of any of items 8-12, wherein the DP algorithm determines a pipeline schedule for pipeline parallelism stage by stage starting from a last stage and ending with a first stage based on downsets which are downward-closed sets of layers.

Item 14. The method of any of items 8-13, wherein the DP algorithm determines a degree of data parallelism, a number of stages and a sequence of contiguous subgraphs, and, for each of the stages, a low-latency schedule to execute layers in the subgraphs using a predetermined number of accelerators.

Item 15. A non-transitory computer readable medium on which are stored instructions that, when executed, cause a programmable device to perform functions of:

receiving input data which includes at least one training script for a deep learning model and defines an area constraint for accelerator optimization;

extracting operator graphs pertaining to each layer in the deep learning model from the at least one training script using a graph extractor component;

estimating a latency for each operator in each of the operator graphs using a runtime estimator component;

generating a set of feasible architecture configurations that satisfy the area constraint using an architecture generator component;

performing an evaluation process that includes:

selecting a current feasible architecture configuration from the set of feasible architecture configurations having a largest area that has not been evaluated;

providing the operator graphs, the latency for each operator in each of the operator graphs, and the current feasible architecture configuration to a solver component;

using the solver component to solve an integer linear program (ILP) for each layer in the deep learning model based on the operator graphs and the latency of each operator in each of the operator graphs to generate an optimal schedule of operators to execute on a single accelerator architecture;

using the solver component to solve a dynamic programming (DP) algorithm with reference to the optimal schedule of operators and the current feasible architecture configuration to determine a distribution strategy that identifies an optimal combination of pipeline parallel depth, data parallel width, and tensor model parallel width for executing the layers across multiple accelerators;

providing feedback to the architecture generator component indicating a throughput for the current feasible architecture configuration; and repeating the evaluation process until a convergence is reached, the convergence being indicated by a characteristic change in performance for the current feasible architecture configuration;

once the convergence has been reached, selecting an optimal architecture configuration from the feasible architecture configurations that has been evaluated and the distribution strategy determined for the optimal architecture configuration to use as a basis for an accelerator design for training the deep learning model.

Item 16. The non-transitory computer readable medium of item 15, wherein the operator graphs comprise Directed Acyclic Graphs (DAGs) with each node in each of the operator graphs corresponding to an operator and edges between operators defining weights and activation functions pertaining to the operators.

Item 17. The non-transitory computer readable medium of any of items 15-16, wherein the ILP determines which operators should be executed on multiple vector cores or multiple tensor cores to implement intra-operator parallelism.

Item 18. The non-transitory computer readable medium of any of items 15-17, wherein the ILP includes predefined constraints, the predefined constraints defining a first strict partial order as a transitive closure of a DAG being evaluated, and wherein the predefined constraints define a second strict partial order which lies between the first strict partial order and a partial order given by execution time intervals of operators in the optimal schedule determined for the DAG, the second strict partial order obviating a need for time-indexed variables in the ILP.

Item 19. The non-transitory computer readable medium of any of items 15-18, wherein the predefined constraints are selected to ensure a resource constraint imposed by the current feasible architecture configuration is not exceeded.

Item 20. The non-transitory computer readable medium of any of items 15-19, wherein the DP algorithm determines a pipeline schedule for pipeline parallelism stage by stage starting from a last stage and ending with a first stage based on downsets which are downward-closed sets of layers.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A training optimization system for training a deep learning model, the training optimization system comprising:

a processor; and a memory in communication with the processor, the memory comprising executable instructions that, when executed by the processor alone or in combination with other processors, cause the training optimization system to perform functions of:

receiving input data which includes at least one training script for the deep learning model and defines an area constraint for accelerator optimization;

extracting operator graphs pertaining to each layer in the deep learning model from the at least one training script using a graph extractor component;

estimating a latency for each operator in each of the operator graphs using a runtime estimator component;

generating a set of feasible architecture configurations that satisfy the area constraint using an architecture generator component, each of the feasible architecture configurations defining a quantity and dimensions of a first type of core and quantity and dimensions of a second type of core wherein each of the feasible architecture configurations is different from the other feasible architecture configurations;

performing an evaluation process that includes:

selecting a current feasible architecture configuration from the set of feasible architecture configurations having a largest area that has not been evaluated;

providing the operator graphs, the latency for each operator in each of the operator graphs, and the current feasible architecture configuration to a solver component;

using the solver component to solve an integer linear program (ILP) for each layer in the deep learning model based on the operator graphs and the latency of each operator in each of the operator graphs to generate an optimal schedule of operators to execute on a single accelerator architecture;

using the solver component to solve a dynamic programming (DP) algorithm with reference to the optimal schedule of operators and the current feasible architecture configuration to determine a distribution strategy that identifies an optimal combination of pipeline parallel depth, data parallel width, and tensor model parallel width for executing the layers across multiple accelerators;

providing feedback to the architecture generator component indicating a throughput for the current feasible architecture configuration; and repeating the evaluation process until a convergence is reached, the convergence being indicated by a decrease in the throughput for the current feasible architecture configuration;

once the convergence has been reached, selecting an optimal architecture configuration from the feasible architecture configurations that has been evaluated and the distribution strategy determined for the optimal architecture configuration to use as a basis for an accelerator design for training the deep learning model.

2. The training optimization system of claim 1, wherein the operator graphs comprise Directed Acyclic Graphs (DAGs) with each node in each of the operator graphs corresponding to an operator and edges between operators defining weights and activation functions pertaining to the operators.

3. The training optimization system of claim 2, wherein the ILP determines which operators should be executed on multiple vector cores or multiple tensor cores to implement intra-operator parallelism.

4. The training optimization system of claim 3, wherein the ILP includes predefined constraints, the predefined constraints defining a first strict partial order as a transitive closure of a DAG being evaluated, and wherein the predefined constraints define a second strict partial order which lies between the first strict partial order and a partial order given by execution time intervals of operators in the optimal schedule determined for the DAG, the second strict partial order obviating a need for time-indexed variables in the ILP.

5. The training optimization system of claim 4, wherein the predefined constraints are selected to ensure a resource constraint imposed by the current feasible architecture configuration is not exceeded.

6. The training optimization system of claim 1, wherein the DP algorithm determines a pipeline schedule for pipeline parallelism stage by stage starting from a last stage and ending with a first stage based on downsets which are downward-closed sets of layers.

7. The training optimization system of claim 6, wherein the DP algorithm determines a degree of data parallelism, a number of stages and a sequence of contiguous subgraphs, and, for each of the stages, a low-latency schedule to execute layers in the subgraphs using a predetermined number of accelerators.

8. A method of training optimization for a deep learning model, the method comprising:

receiving input data which includes at least one training script for the deep learning model and defines an area constraint for accelerator optimization;

extracting operator graphs pertaining to each layer in the deep learning model from the at least one training script using a graph extractor component;

estimating a latency for each operator in each of the operator graphs using a runtime estimator component;

generating a set of feasible architecture configurations that satisfy the area constraint using an architecture generator component, each of the feasible architecture configurations defining a quantity and dimensions of a first type of core and quantity and dimensions of a second type of core wherein each of the feasible architecture configurations is different from the other feasible architecture configurations;

performing an evaluation process that includes:

selecting a current feasible architecture configuration from the set of feasible architecture configurations having a largest area that has not been evaluated;

providing the operator graphs, the latency for each operator in each of the operator graphs, and the current feasible architecture configuration to a solver component;

using the solver component to solve an integer linear program (ILP) for each layer in the deep learning model based on the operator graphs and the latency of each operator in each of the operator graphs to generate an optimal schedule of operators to execute on a single accelerator architecture;

using the solver component to solve a dynamic programming (DP) algorithm with reference to the optimal schedule of operators and the current feasible architecture configuration to determine a distribution strategy that identifies an optimal combination of pipeline parallel depth, data parallel width, and tensor model parallel width for executing the layers across multiple accelerators;

providing feedback to the architecture generator component indicating a throughput for the current feasible architecture configuration; and repeating the evaluation process until a convergence is reached, the convergence being indicated by a characteristic change in performance for the current feasible architecture configuration;

once the convergence has been reached, selecting an optimal architecture configuration from the feasible architecture configurations that has been evaluated and the distribution strategy determined for the optimal architecture configuration to use as a basis for an accelerator design for training the deep learning model.

9. The method of claim 8, wherein the operator graphs comprise Directed Acyclic Graphs (DAGs) with each node in each of the operator graphs corresponding to an operator and edges between operators defining weights and activation functions pertaining to the operators.

10. The method of claim 9, wherein the ILP determines which operators should be executed on multiple vector cores or multiple tensor cores to implement intra-operator parallelism.

11. The method of claim 10, wherein the ILP includes predefined constraints, the predefined constraints defining a first strict partial order as a transitive closure of a DAG being evaluated, and wherein the predefined constraints define a second strict partial order which lies between the first strict partial order and a partial order given by execution time intervals of operators in the optimal schedule determined for the DAG, the second strict partial order obviating a need for time-indexed variables in the ILP.

12. The method of claim 11, wherein the predefined constraints are selected to ensure a resource constraint imposed by the current feasible architecture configuration is not exceeded.

13. The method of claim 8, wherein the DP algorithm determines a pipeline schedule for pipeline parallelism stage by stage starting from a last stage and ending with a first stage based on downsets which are downward-closed sets of layers.

14. The method of claim 13, wherein the DP algorithm determines a degree of data parallelism, a number of stages and a sequence of contiguous subgraphs, and, for each of the stages, a low-latency schedule to execute layers in the subgraphs using a predetermined number of accelerators.

15. A non-transitory computer readable medium on which are stored instructions that, when executed, cause a programmable device to perform functions of:

receiving input data which includes at least one training script for a deep learning model and defines an area constraint for accelerator optimization;

extracting operator graphs pertaining to each layer in the deep learning model from the at least one training script using a graph extractor component;

estimating a latency for each operator in each of the operator graphs using a runtime estimator component;

generating a set of feasible architecture configurations that satisfy the area constraint using an architecture generator component, each of the feasible architecture configurations defining a quantity and dimensions of a first type of core and quantity and dimensions of a second type of core wherein each of the feasible architecture configurations is different from the other feasible architecture configurations;

performing an evaluation process that includes:

selecting a current feasible architecture configuration from the set of feasible architecture configurations having a largest area that has not been evaluated;

providing the operator graphs, the latency for each operator in each of the operator graphs, and the current feasible architecture configuration to a solver component;

using the solver component to solve an integer linear program (ILP) for each layer in the deep learning model based on the operator graphs and the latency of each operator in each of the operator graphs to generate an optimal schedule of operators to execute on a single accelerator architecture;

using the solver component to solve a dynamic programming (DP) algorithm with reference to the optimal schedule of operators and the current feasible architecture configuration to determine a distribution strategy that identifies an optimal combination of pipeline parallel depth, data parallel width, and tensor model parallel width for executing the layers across multiple accelerators;

providing feedback to the architecture generator component indicating a throughput for the current feasible architecture configuration; and repeating the evaluation process until a convergence is reached, the convergence being indicated by a characteristic change in performance for the current feasible architecture configuration;

once the convergence has been reached, selecting an optimal architecture configuration from the feasible architecture configurations that has been evaluated and the distribution strategy determined for the optimal architecture configuration to use as a basis for an accelerator design for training the deep learning model.

16. The non-transitory computer readable medium of claim 15, wherein the operator graphs comprise Directed Acyclic Graphs (DAGs) with each node in each of the operator graphs corresponding to an operator and edges between operators defining weights and activation functions pertaining to the operators.

17. The non-transitory computer readable medium of claim 16, wherein the ILP determines which operators should be executed on multiple vector cores or multiple tensor cores to implement intra-operator parallelism.

18. The non-transitory computer readable medium of claim 17, wherein the ILP includes predefined constraints, the predefined constraints defining a first strict partial order as a transitive closure of a DAG being evaluated, and wherein the predefined constraints define a second strict partial order which lies between the first strict partial order and a partial order given by execution time intervals of operators in the optimal schedule determined for the DAG, the second strict partial order obviating a need for time-indexed variables in the ILP.

19. The non-transitory computer readable medium of claim 18, wherein the predefined constraints are selected to ensure a resource constraint imposed by the current feasible architecture configuration is not exceeded.

20. The non-transitory computer readable medium of claim 15, wherein the DP algorithm determines a pipeline schedule for pipeline parallelism stage by stage starting from a last stage and ending with a first stage based on downsets which are downward-closed sets of layers.

* * * * *